(12) United States Patent
Martinez

(10) Patent No.: US 12,197,537 B2
(45) Date of Patent: Jan. 14, 2025

(54) INFORMATION PROCESSING APPARATUS AND MODEL GENERATION METHOD

(71) Applicant: FUJITSU LIMITED, Kawasaki (JP)

(72) Inventor: Ander Martinez, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 369 days.

(21) Appl. No.: 17/583,255

(22) Filed: Jan. 25, 2022

(65) Prior Publication Data

US 2022/0292313 A1    Sep. 15, 2022

(30) Foreign Application Priority Data

Mar. 10, 2021   (JP) ................................ 2021-037911

(51) Int. Cl.
*G06F 18/214* (2023.01)
*G06F 18/20* (2023.01)
*G06T 7/11* (2017.01)
*G06T 11/00* (2006.01)

(52) U.S. Cl.
CPC ........ *G06F 18/2148* (2023.01); *G06F 18/285* (2023.01); *G06T 7/11* (2017.01); *G06T 11/00* (2013.01); *G06T 2207/20081* (2013.01); *G06T 2207/20221* (2013.01)

(58) Field of Classification Search
CPC ...... G06F 18/2148; G06F 18/285; G06T 7/11; G06T 11/00; G06T 2207/20081; G06T 2207/20221; G06T 2207/30176
See application file for complete search history.

(56) References Cited

U.S. PATENT DOCUMENTS 10,572,725 B1 * 2/2020 Becker ................ G06F 18/2413
2019/0139212 A1 * 5/2019 Hanzawa ................ G06N 3/08
(Continued)

FOREIGN PATENT DOCUMENTS

JP     2008-022159 A    1/2008

OTHER PUBLICATIONS

Liang-Chieh Chen et al., "Encoder-Decoder with Atrous Separable Convolution for Semantic Image Segmentation", Cornell University, arXiv:1802.02611v3 [cs.CV], Aug. 22, 2018, pp. 1-18 (Total 18 pages).

(Continued)

*Primary Examiner* — Margaret G Mastrodonato
(74) *Attorney, Agent, or Firm* — Fujitsu Intellectual Property Center

(57) ABSTRACT

A non-transitory computer-readable recording medium stores a program for causing a computer to execute a process, the process includes inputting an accepted image to a first model generated through machine learning based on a composite image and information, the composite image being obtained by combining a first plurality of images each of which includes one area, the information indicating a combination state of the first plurality of images in the composite image, inputting a first image among a second plurality of images output by the first model to a second model generated through machine learning based on an image which includes one area and an image which includes a plurality of areas, and determining whether to input the first image to the first model, based on a result output by the second model in response to the inputting of the first image.

12 Claims, 13 Drawing Sheets

(56) References Cited

U.S. PATENT DOCUMENTS

2022/0051140 A1* 2/2022 Oi .......................... G06N 20/00
2023/0171369 A1* 6/2023 Yabusaki .................. G06T 7/70
382/107

OTHER PUBLICATIONS

Kartik Srivastava et al., "Multi Modal Semantic Segmentation Using Synthetic Data", Cornell University, arXiv: 1910.13676v1 [cs.CV], Oct. 30, 2019 (Total 6 pages).

Xu Zhong et al., "PubLayNet: Largest Dataset Ever for Document Layout Analysis", Cornell University, arXiv:1908.07836v1 [cs.CL], Aug. 16, 2019 (Total 8 pages).

Li Y. et al., "DeepLayout: A Semantic Segmentation Approach to p. Layout Analysis", International Conference on Intelligent Computing, ICIC 2018: Intelligent Computing Methodologies, pp. 266-277, Lecture Notes in Computer Science, vol. 10956, Springer Cham, Jul. 6, 2018 (Total 14 pages).

Christophe Rigaud, "Segmentation and Indexation of Complex Objects in Comic Book Images", Image Proceeding [eess.IV], University of the Rochelle, HAL, archives-ouvertes, Electronic Letters on Computer Vision and Image Analysis 14(3), pp. 1-171, 2014 (Total 198 pages).

Nhu-Van Nguyen et al., "Digital Comics Image Indexing Based on Deep Learning", Journal of Imaging 2018, 4, 89; doi:10.3390/jimaging4070089, pp. 1-34, 2018 (Total 34 pages).

\* cited by examiner

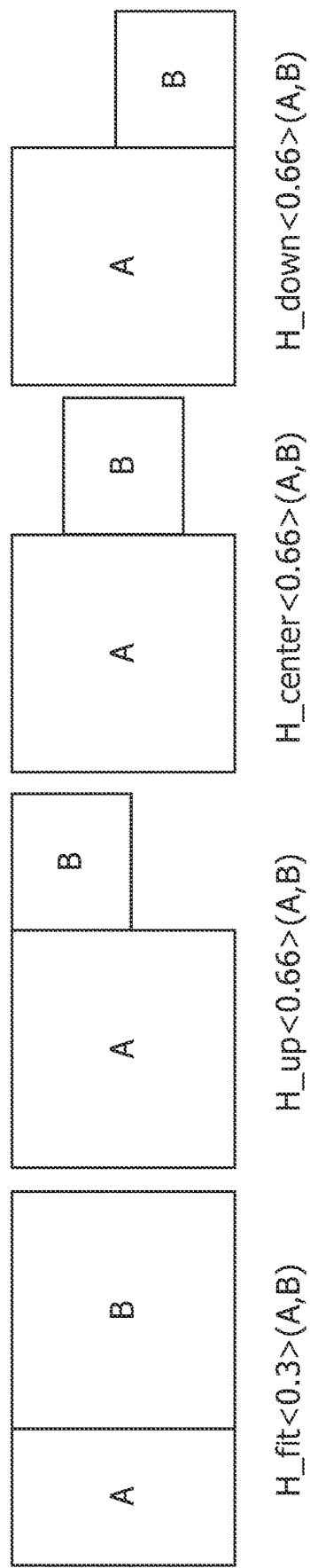

GRID<2,3>(A,B,C,D,E,F)

H_down<0.6>(A,V_right<0.3>(B,C))

INFORMATION PROCESSING APPARATUS AND MODEL GENERATION METHOD

CROSS-REFERENCE TO RELATED APPLICATION

This application is based upon and claims the benefit of priority of the prior Japanese Patent Application No. 2021-37911, filed on Mar. 10, 2021, the entire contents of which are incorporated herein by reference.

FIELD

The embodiment discussed herein is related to an information processing apparatus and a model generation method.

BACKGROUND

Electronic documents and paper documents often include a plurality of images combined in accordance with a certain pattern. In a case of analyzing a composite image obtained by combining a plurality of images, it is desirable to segment the composite image into the plurality of images and to individually process each of the images.

Document layout analysis in optical character recognition (OCR) often uses a rule-based segmentation method that does not use teacher data. In this segmentation method, for example, a document is segmented into a plurality of areas by using rules defined by a person and parameters or a filter created by a person. Connected component analysis (CCA), the Run Length Smoothing Algorithm (RLSA), clustering, edge detection, and so on may also be used.

On the other hand, a segmentation method that uses teacher data is often applied to semantic segmentation that uses machine learning. In semantic segmentation, segmentation and labeling are performed by a single model, and a label may be assigned to any shape or polygon.

As an example of semantic segmentation, DeepLab is known. Semantic segmentation using synthetic data is also known. The largest dataset for document layout analysis is also known.

Page layout analysis using semantic segmentation is also known. A technique for segmenting a comic book image and assigning indices to the segmented images is also known.

A document processing apparatus that effectively uses, as one piece of object data, pieces of segmented object data included in a page such as a double-page spread in a document is also known.

Japanese Laid-open Patent Publication No. 2008-22159 is disclosed as related art.

Liang-Chieh Chen et al., "Encoder-Decoder with Atrous Separable Convolution for Semantic Image Segmentation", arXiv:1802.02611, Cornell University, 2018; K. Srivastava et al., "Multi Modal Semantic Segmentation using Synthetic Data", arXiv:1910.13676, Cornell University, 2019; X. Zhong et al., "PubLayNet: largest dataset ever for document layout analysis", arXiv:1908.07836, Cornell University, 2019; Y. Li et al., "DeepLayout: A Semantic Segmentation Approach to Page Layout Analysis", In: Huang et al. (Eds) Intelligent Computing Methodologies, ICIC 2018, Lecture Notes in Computer Science, volume 10956, pages 266-277, 2018; C. Rigaud, "Segmentation and indexation of complex objects in comic book images", Electronic Letters on Computer Vision and Image Analysis 14 (3), 2014; and N. Nguyen et al., "Digital Comics Image Indexing Based on Deep Learning", Journal of Imaging, 4, 89, 2018 are also disclosed as related art.

A size of an area to which a composite image included in a document is to be segmented varies in accordance with a type of the document and a purpose of document analysis. For this reason, it is difficult to determine an appropriate size of the segmented area.

Such an issue occurs not only in a case where a composite image included in a document is segmented but also in a case where various images are segmented.

SUMMARY

According to an aspect of the embodiment, a non-transitory computer-readable recording medium stores a program for causing a computer to execute a process, the process includes inputting an accepted image to a first model generated through machine learning based on first training data, the first training data including a composite image and information, the composite image being obtained by combining a first plurality of images each of which includes one area, the information indicating a combination state of the first plurality of images in the composite image, inputting a first image among a second plurality of images to a second model generated through machine learning based on second training data, the second plurality of images being output by the first model in response to the inputting of the accepted image and obtained by segmenting the accepted image, the second training data including an image which includes one area and an image which includes a plurality of areas, and determining whether to input the first image to the first model, based on a result output by the second model in response to the inputting of the first image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 4A to 4D are diagrams illustrating horizontal patterns;

DESCRIPTION OF EMBODIMENT

An embodiment will be described in detail below with reference to the drawings.

Figure 1:
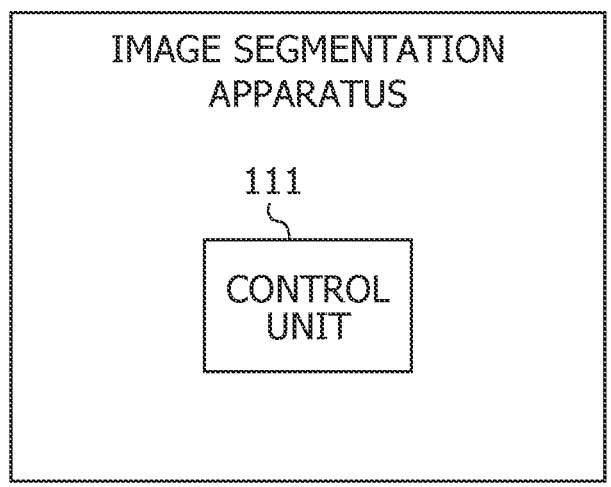
FIG. 1 is a functional configuration diagram of an image segmentation apparatus.

FIG. 1 illustrates an example of a functional configuration of an image segmentation apparatus according to the embodiment. An image segmentation apparatus 101 in FIG. 1 includes a control unit 111.

Figure 2:
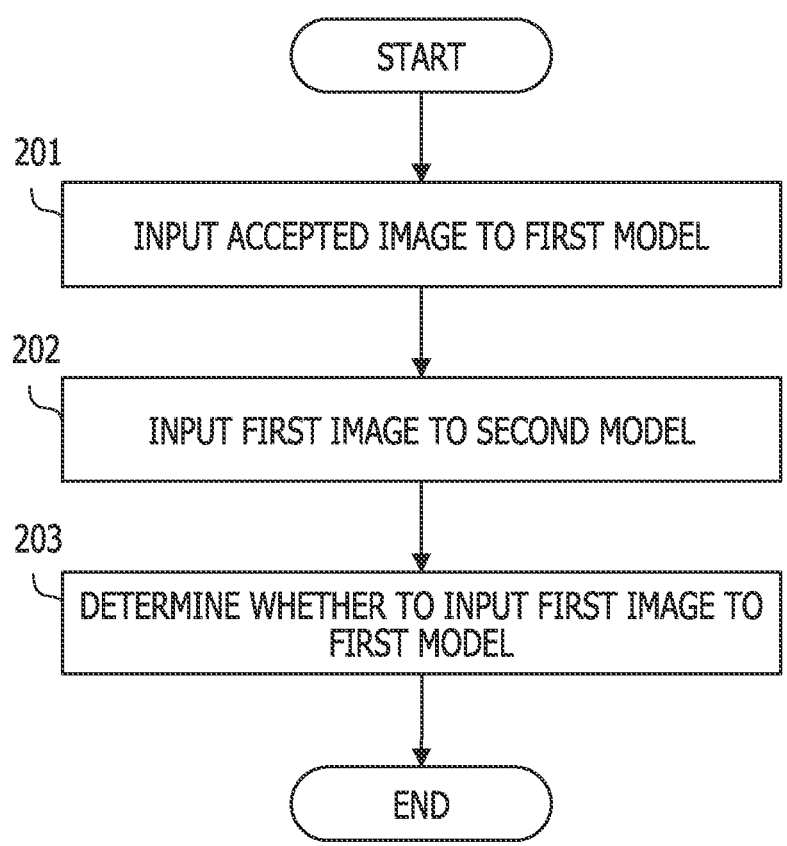
FIG. 2 is a flowchart of an image segmentation process.

FIG. 2 is a flowchart illustrating an example of an image segmentation process performed by the control unit 111 in FIG. 1. First, the control unit 111 inputs an accepted image to a first model (step 201). The first model is generated through machine learning based on training data that includes a composite image obtained by combining a plurality of images each of which includes one area and that includes information which indicates a combination state of the plurality of images included in the composite image.

Subsequently, the control unit 111 inputs, to a second model, a first image among a plurality of images that are output by the first model in response to the inputting of the image and that are obtained by segmenting the image (step 202). The second model is generated through machine learning based on training data that includes an image which includes one area and an image which includes a plurality of areas.

Subsequently, the control unit 111 determines whether to input the first image to the first model, based on a result output by the second model in response to the inputting of the first image (step 203).

The image segmentation apparatus 101 in FIG. 1 may appropriately segment an image including a plurality of areas.

Figure 3:
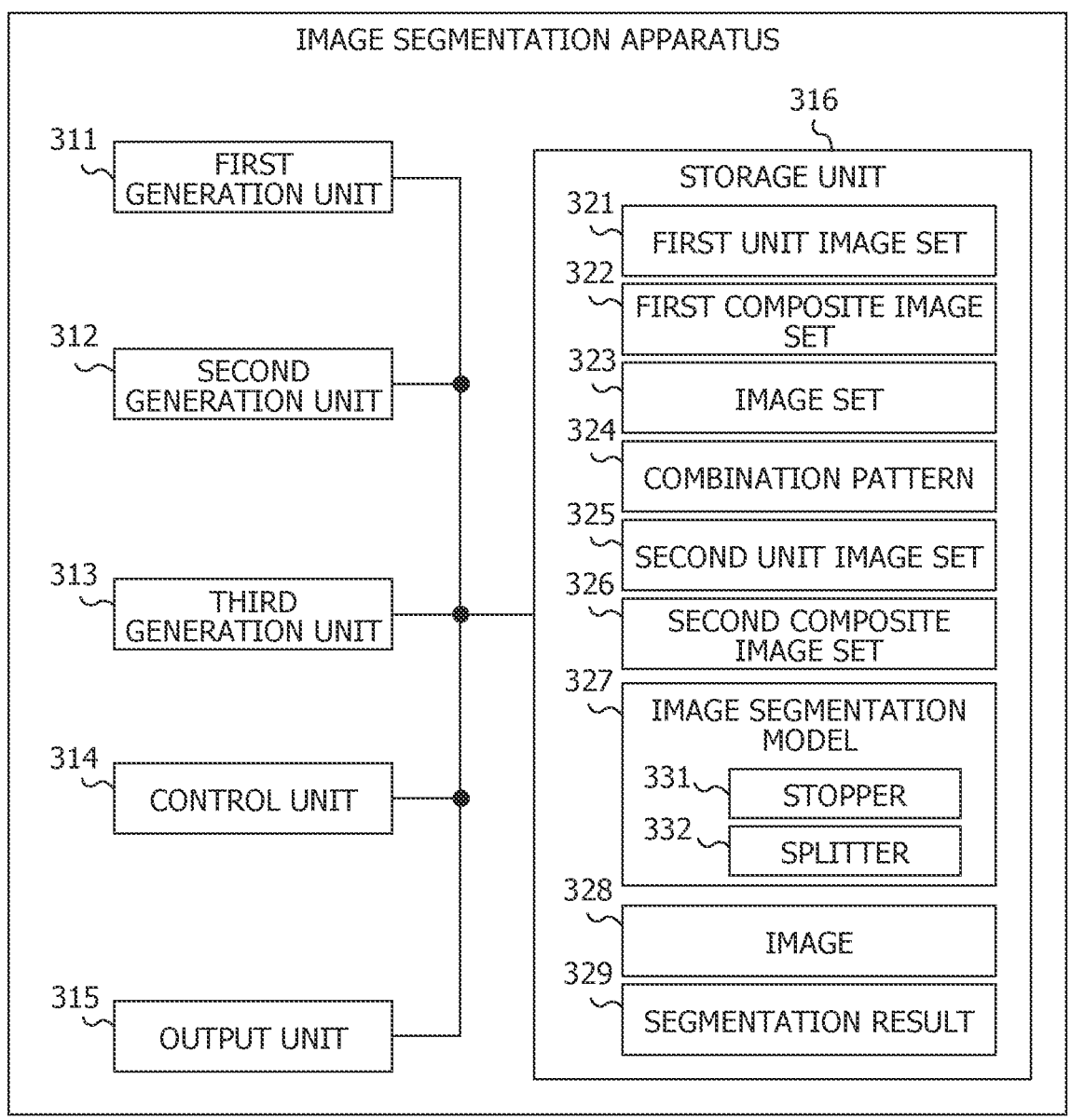
FIG. 3 is a functional configuration diagram illustrating a specific example of the image segmentation apparatus.

FIG. 3 illustrates a specific example of the image segmentation apparatus 101 in FIG. 1. An image segmentation apparatus 301 in FIG. 3 includes a first generation unit 311, a second generation unit 312, a third generation unit 313, a control unit 314, an output unit 315, and a storage unit 316, and operates in an operating mode that is either a machine learning mode or an operation mode. The control unit 314 corresponds to the control unit 111 in FIG. 1.

In the machine learning mode, the storage unit 316 stores a first unit image set 321, a first composite image set 322, an image set 323, and a combination pattern 324. The combination pattern 324 is an example of a predetermined combination pattern.

The first unit image set 321, the first composite image set 322, the image set 323, and the combination pattern 324 are selected in accordance with the use of the image segmentation apparatus 301. Examples of the use of the image segmentation apparatus 301 include segmentation of an image included in a document such as an academic paper, segmentation of a frame of a comic book image, and so on.

The first unit image set 321 includes a plurality of unit images labeled through a manual operation by a person. Each unit image is an image including only one area. Each unit image is assigned a label indicating that the image is a unit image. The first composite image set 322 includes a plurality of composite images labeled through a manual operation by a person. Each composite image is an image including a plurality of unit images. Each composite image is assigned a label indicating that the image is a composite image.

The image set 323 includes a plurality of images that are not labeled. Each image is either a unit image or a composite image. The number of images included in the image set 323 is greater than a sum of the number of unit images included in the first unit image set 321 and the number of composite images included in the first composite image set 322. The combination pattern 324 represents rules that define combination states of a plurality of unit images included in various composite images.

FIGS. 4A to 7 illustrate examples of the combination pattern 324 for combining rectangular unit images. FIGS. 4A to 4D illustrate examples of horizontal patterns in which a unit image A and a unit image B are arranged and combined adjacently to each other in a horizontal direction.

FIG. 4A illustrates an example of H_fit<r>(A, B). In H_fit<r>(A, B), a composite image is generated by stacking the unit image A and the unit image B in the horizontal direction such that a vertical-direction length (height) of the unit image A matches a height of the unit image B. "r" represents a ratio of a horizontal-direction length (width) of the unit image A to a width of the composite image. In this example, r=0.3 holds. An aspect ratio of at least one of the unit image A and the unit image B is changed.

FIG. 4B illustrates an example of H_up<r>(A, B). In H_up<r>(A, B), a composite image is generated by stacking the unit image A and the unit image B in the horizontal direction such that an upper end of the unit image A and an upper end of the unit image B are aligned at the same height. "r" represents a ratio of the width of the unit image A to the width of the composite image. In this example, r=0.66 holds. The aspect ratios of the unit image A and the unit image B are not changed.

FIG. 4C illustrates an example of H_center<r>(A, B). In H_center<r>(A, B), a composite image is generated by stacking the unit image A and the unit image B in the horizontal direction such that a barycenter of the unit image A and a barycenter of the unit image B are aligned at the same height. "r" represents a ratio of the width of the unit image A to the width of the composite image. In this example, r=0.66 holds. The aspect ratios of the unit image A and the unit image B are not changed.

FIG. 4D illustrates an example of H_down<r>(A, B). In H_down<r>(A, B), a composite image is generated by stacking the unit image A and the unit image B in the horizontal direction such that a lower end of the unit image A and a lower end of the unit image B are aligned at the same height. "r" represents a ratio of the width of the unit image A to the width of the composite image. In this example, r=0.66 holds. The aspect ratios of the unit image A and the unit image B are not changed.

Figure 5A:
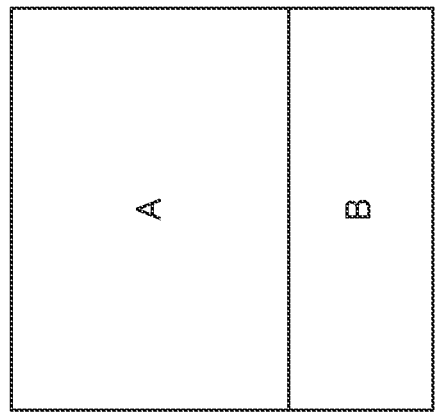
FIGS. 5A to 5C are diagrams illustrating vertical patterns.
Figure 5B:
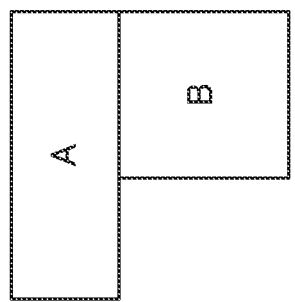
Figure 5C:
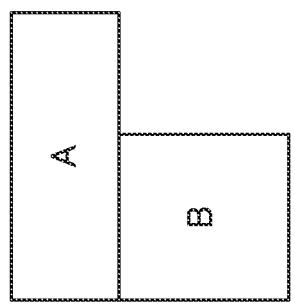

FIGS. 5A to 5C illustrate examples of vertical patterns in which the unit image A and the unit image B are arranged and combined adjacently to each other in a vertical direction.

FIG. 5A illustrates an example of V_left<r>(A, B). In V_left<r>(A, B), a composite image is generated by stacking the unit image A and the unit image B in the vertical direction such that a left end of the unit image A and a left end of the unit image B are aligned at the same horizontal position. "r" represents a ratio of the height of the unit image A to the height of the composite image. In this example, r=0.3 holds. The aspect ratios of the unit image A and the unit image B are not changed.

FIG. 5B illustrates an example of V_right<r>(A, B). In V_right<r>(A, B), a composite image is generated by stacking the unit image A and the unit image B in the vertical direction such that a right end of the unit image A and a right end of the unit image B are aligned at the same horizontal position. "r" represents a ratio of the height of the unit image A to the height of the composite image. In this example, r=0.3 holds. The aspect ratios of the unit image A and the unit image B are not changed.

FIG. 5C illustrates an example of V_fit<r>(A, B). In V_fit<r>(A, B), a composite image is generated by stacking the unit image A and the unit image B in the vertical direction such that the width of the unit image A matches the width of the unit image B. "r" represents a ratio of the height of the unit image A to the height of the composite image. In this example, r=0.6 holds. An aspect ratio of at least one of the unit image A and the unit image B is changed.

Figure 6:
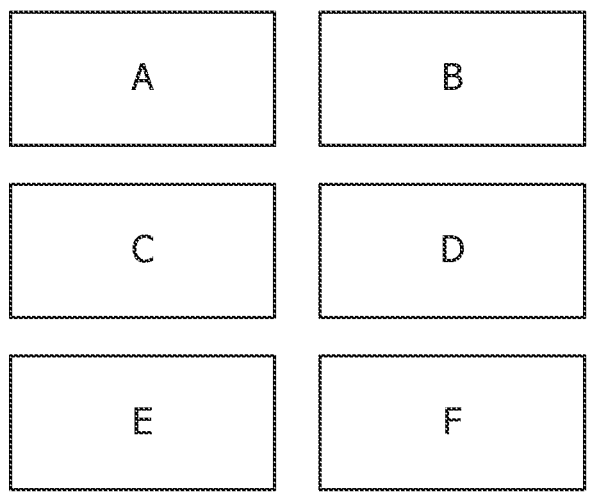
FIG. 6 is a diagram illustrating a grid pattern.

FIG. 6 illustrates an example of a grid pattern GRID<col, row>(img[col*row]) in which a plurality of unit images are arranged and combined in a grid shape. "col" represents the number of columns of the grid, and "row" represents the number of rows of the grid. In GRID<col, row>(img [col*row]), a composite image is generated by arranging col*row unit images in a grid shape. In this example, "col"=2 and "row"=3 hold. Thus, a unit image A to a unit image F are arranged in a grid shape of 3 rows and 2 columns.

Figure 7:
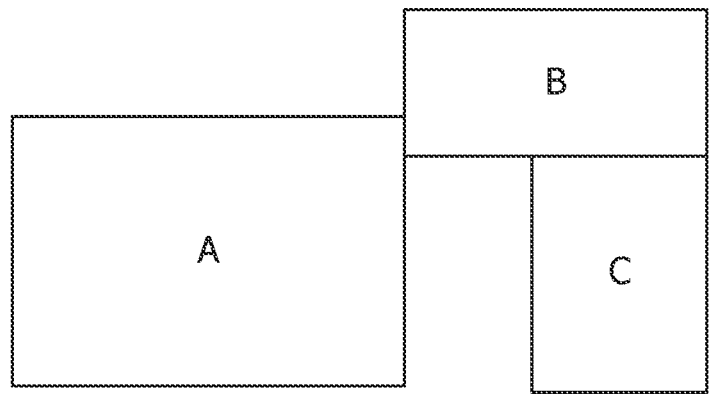
FIG. 7 a diagram illustrating a recursive pattern.

FIG. 7 illustrates an example of a recursive pattern H_down<r>(A, V_right<p>(B, C)) in which H_down<r>(A, B) and V_right<r>(A, B) are recursively combined. First, in accordance with V_right<p>(B, C), the unit image B and the unit image C are arranged in the vertical direction such that the right end of the unit image B and the right end of the unit image C are aligned at the same horizontal position. In this example, p=0.3 holds.

Subsequently, in accordance with H_down<r>(A, V_right<p>(B, C)), the unit image A and an image obtained by combining the unit image B and the unit image C are arranged in the horizontal direction such that the lower end of the unit image A and the lower end of the unit image C are aligned at the same height. In this example, r=0.6 holds.

Figure 8:
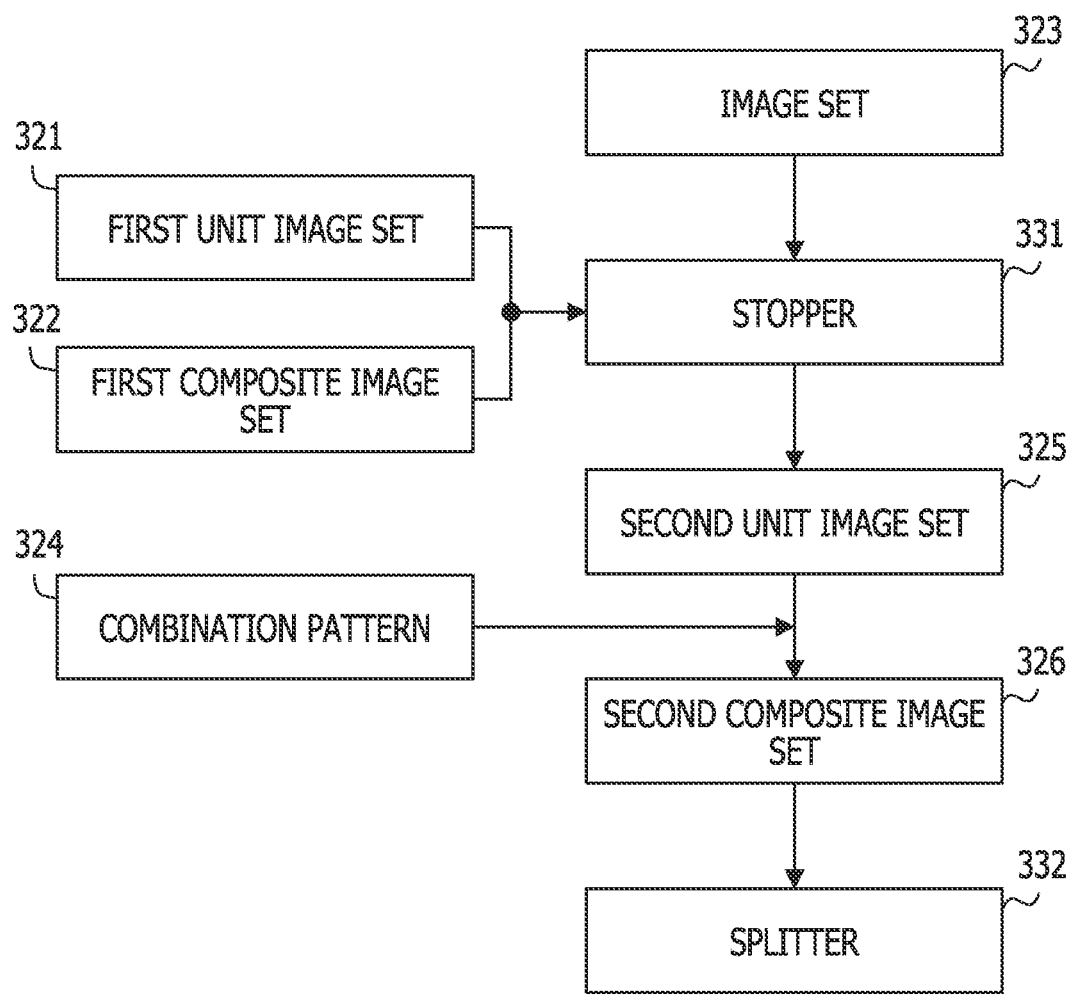
FIG. 8 is a diagram illustrating a training process.

FIG. 8 illustrates an example of a training process performed in the machine learning mode. The first generation unit 311 in FIG. 3 gives the first unit image set 321 and the first composite image set 322 as training data to a machine learning model and causes the machine learning model to perform supervised machine learning, thereby generating a stopper 331 which is a trained model. Labels assigned to each unit image and each composite image are used as teacher data in the supervised machine learning.

In the operation mode, the stopper 331 outputs a determination result indicating which of a unit image or a composite image an input image is. The stopper 331 is an example of the second model.

Subsequently, the second generation unit 312 in FIG. 3 inputs each image included in the image set 323 to the stopper 331, and classifies each image into either a unit image or a composite image, based on the determination result output from the stopper 331. The second generation unit 312 selects only the unit images from the image set 323, generates a second unit image set 325, and stores the second unit image set 325 in the storage unit 316 in FIG. 3.

By classifying each image into either a unit image or a composite image by using the stopper 331, it is possible to extract a sufficient number of unit images from many images and generate the second unit image set 325. Consequently, unit images are no longer to be extracted through a manual operation. Thus, it is possible to easily generate the second unit image set 325 including more unit images than the first unit image set 321.

Subsequently, the second generation unit 312 generates a plurality of composite images by combining a plurality of images included in the second unit image set 325 based on the combination pattern 324. The second generation unit 312 assigns identification information indicating the combination pattern 324 of each of the generated composite images as teacher data for the composite image, generates a second composite image set 326, and stores the second composite image set 326 in the storage unit 316. The identification information indicating the combination pattern 324 is an example of information which indicates a combination state in a composite image.

By combining a plurality of images based on the combination pattern 324, it is possible to easily generate the second composite image set 326 including many composite images corresponding to various combination states.

Subsequently, the second generation unit 312 gives the second composite image set 326 to a machine learning model as training data and causes the machine learning model to perform supervised machine learning, thereby generating a splitter 332 which is a trained model. Identification information assigned to each composite image is used as teacher data in the supervised machine learning.

In the operation mode, the splitter 332 identifies identification information of the combination pattern 324 corresponding to an input image. The splitter 332 segments the input image into a plurality of images in accordance with the combination pattern 324 indicated by the identified identification information, and outputs the plurality of images. The splitter 332 is an example of the first model.

The second generation unit 312 may generate a plurality of composite images by using the first unit image set 321 instead of the second unit image set 325.

Subsequently, the third generation unit 313 in FIG. 3 generates an image segmentation model 327 by combining the stopper 331 and the splitter 332, and stores the image segmentation model 327 in the storage unit 316.

In the operation mode, the storage unit 316 stores the combination pattern 324, the image segmentation model 327, and an image 328 to be processed as illustrated in FIG. 3. The image 328 may be an image inserted in a document such as an academic paper or may be a comic book image including a plurality of frames.

First, the control unit 314 inputs the image 328 to the stopper 331. The stopper 331 outputs a determination result in response to the inputting of the image 328. Based on the determination result output from the stopper 331, the control unit 314 determines whether to input the image 328 to the splitter 332.

In a case where the determination result indicates a composite image, the control unit 314 accepts the image 328 and inputs the image 328 to the splitter 332. The splitter 332 segments the image 328 into a plurality of images in accordance with the combination pattern 324 and outputs the plurality of images.

Subsequently, the control unit 314 recursively inputs, to the stopper 331, each of the plurality of images output from the splitter 332. The stopper 331 outputs a determination result in response to the inputting of each of the images. Based on the determination result output from the stopper 331, the control unit 314 determines whether to input each of the images to the splitter 332.

In a case where the determination result for any of the images indicates a composite image, the control unit 314 accepts the image and inputs the image to the splitter 332. The splitter 332 segments the accepted image into a plurality of images in accordance with the combination pattern 324 and outputs the plurality of images. By recursively repeating such image segmentation by using the stopper 331 and the splitter 332, it is possible to more finely segment an image having a determination result indicating a composite image.

In a case where the determination result for any of the images indicates a unit image, the control unit 314 determines that the image is not to be input to the splitter 332 and cancels image segmentation for the image. The control unit 314 generates a segmentation result 329 (FIG. 3) including, as a unit image, the image for which image segmentation has been canceled, and stores the segmentation result 329 in the storage unit 316. The output unit 315 outputs the segmentation result 329. Consequently, finer segmentation of an image having a determination result indicating is a unit image may be avoided.

In a case where the determination result for the image 328 indicates a unit image, the control unit 314 cancels image segmentation for the image 328, generates the segmentation result 329 including only the image 328, and stores the segmentation result 329 in the storage unit 316. The output unit 315 outputs the segmentation result 329.

The output unit 315 may output the segmentation result 329 to post-processing that performs image analysis. In this case, in the post-processing, the plurality of images included in the segmentation result 329 are analyzed individually or in association with each other.

Figure 9:
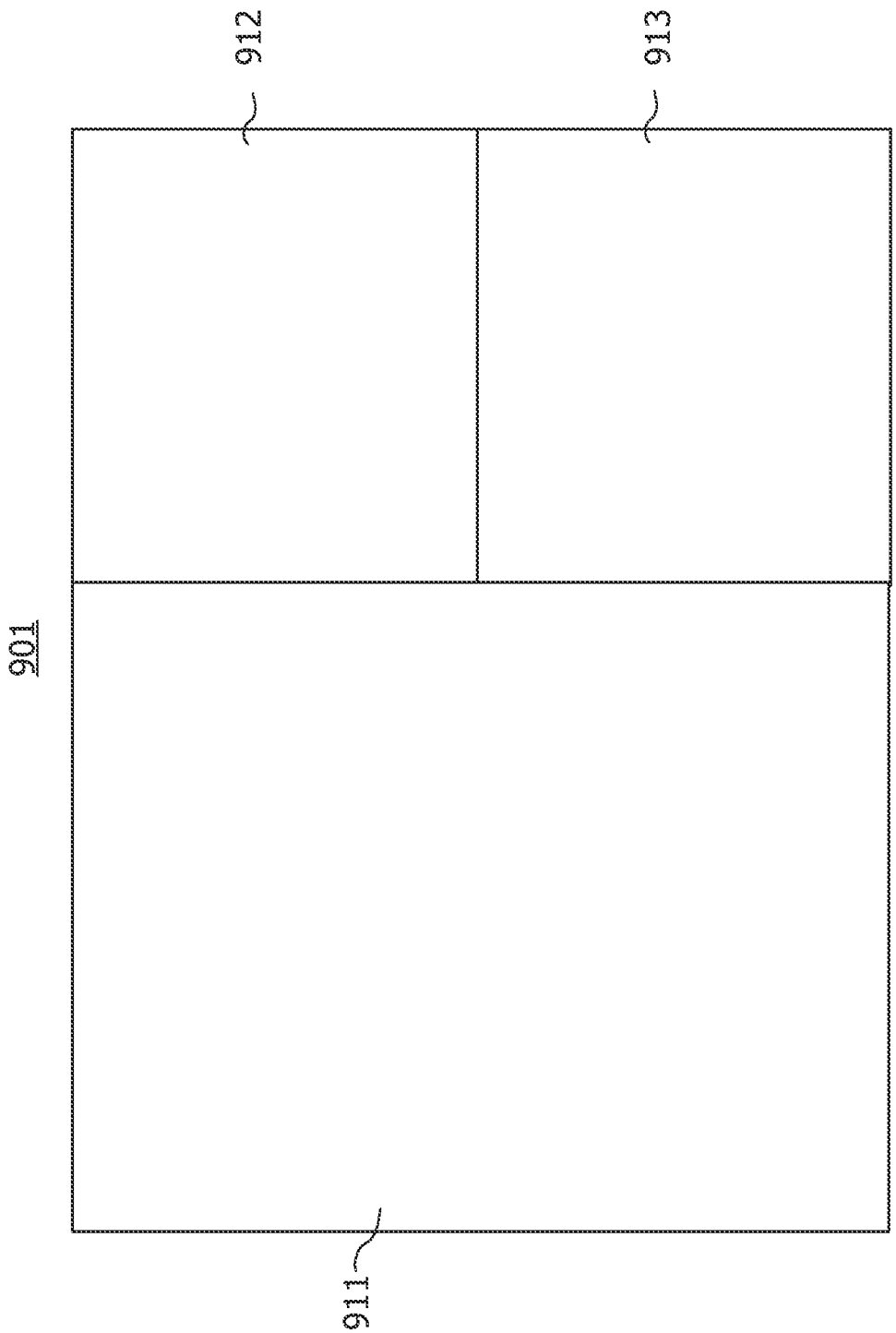
FIG. 9 is a diagram illustrating a first image segmentation process.

FIG. 9 illustrates an example of a first image segmentation process. An image 901 illustrated in FIG. 9 is an image inserted in a document of an academic paper, and includes areas 911 to 913. Each area includes a unit image of a graph indicating an experiment result. By inputting the image 901 as the image 328 to be processed to the image segmentation apparatus 301, the image 901 is segmented into three unit images which are the areas 911 to 913.

Figure 10:
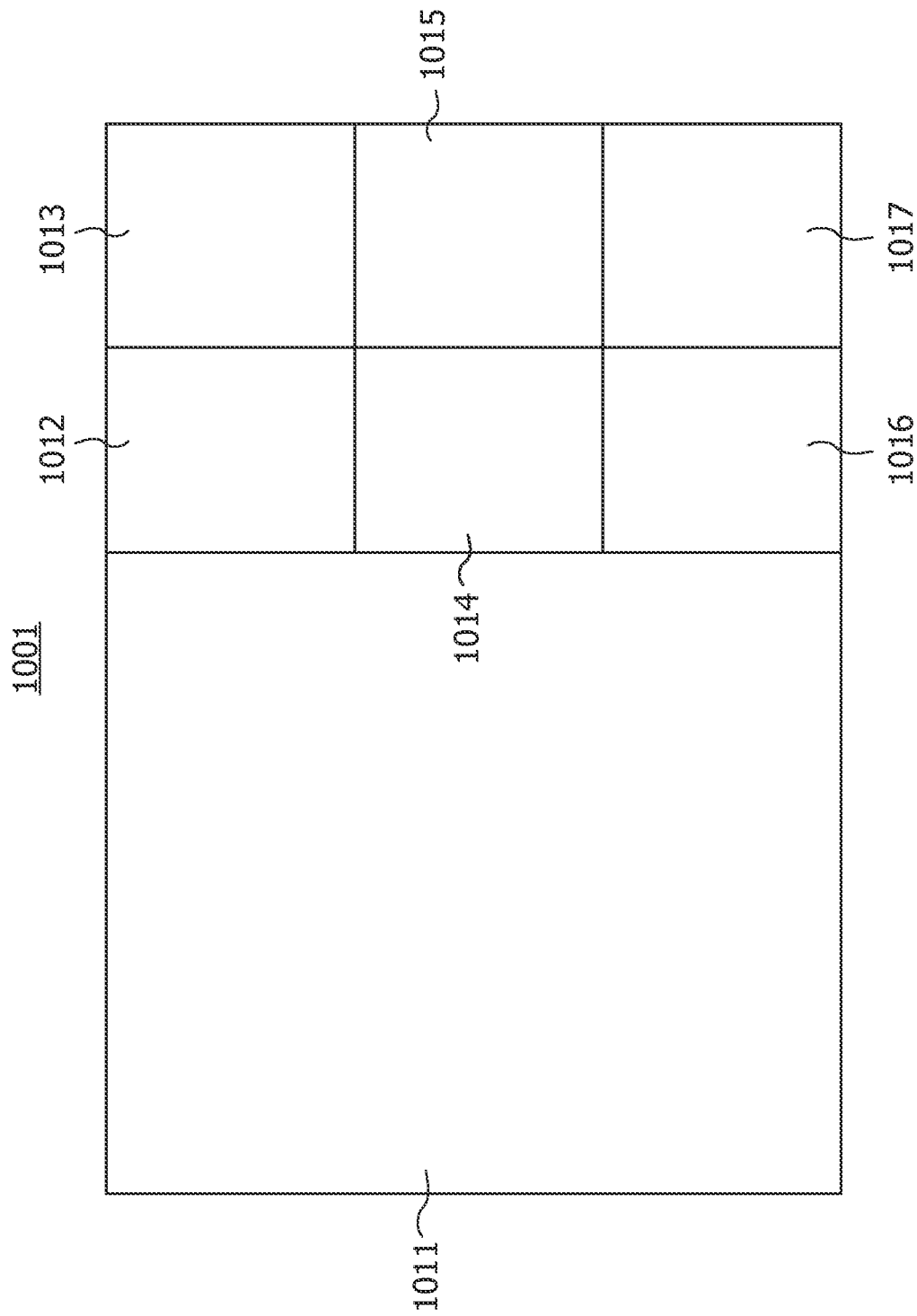
FIG. 10 is a diagram illustrating a second image segmentation process.

FIG. 10 illustrates an example of a second image segmentation process. An image 1001 in FIG. 10 is an image inserted in a document of an academic paper, and includes areas 1011 to 1017. Each area includes a unit image of a graph indicating an experiment result. By inputting the image 1001 as the image 328 to be processed to the image segmentation apparatus 301, the image 1001 is segmented into seven unit images which are the areas 1011 to 1017.

By determining whether each of images obtained by segmenting the image 328 to be processed is a unit image by using the stopper 331, the image segmentation apparatus 301 in FIG. 3 may easily determine whether to further segment the corresponding image. Consequently, image segmentation performed by the splitter 332 may be ended at a time point when the image 328 is segmented to areas having appropriate sizes.

Figure 11:
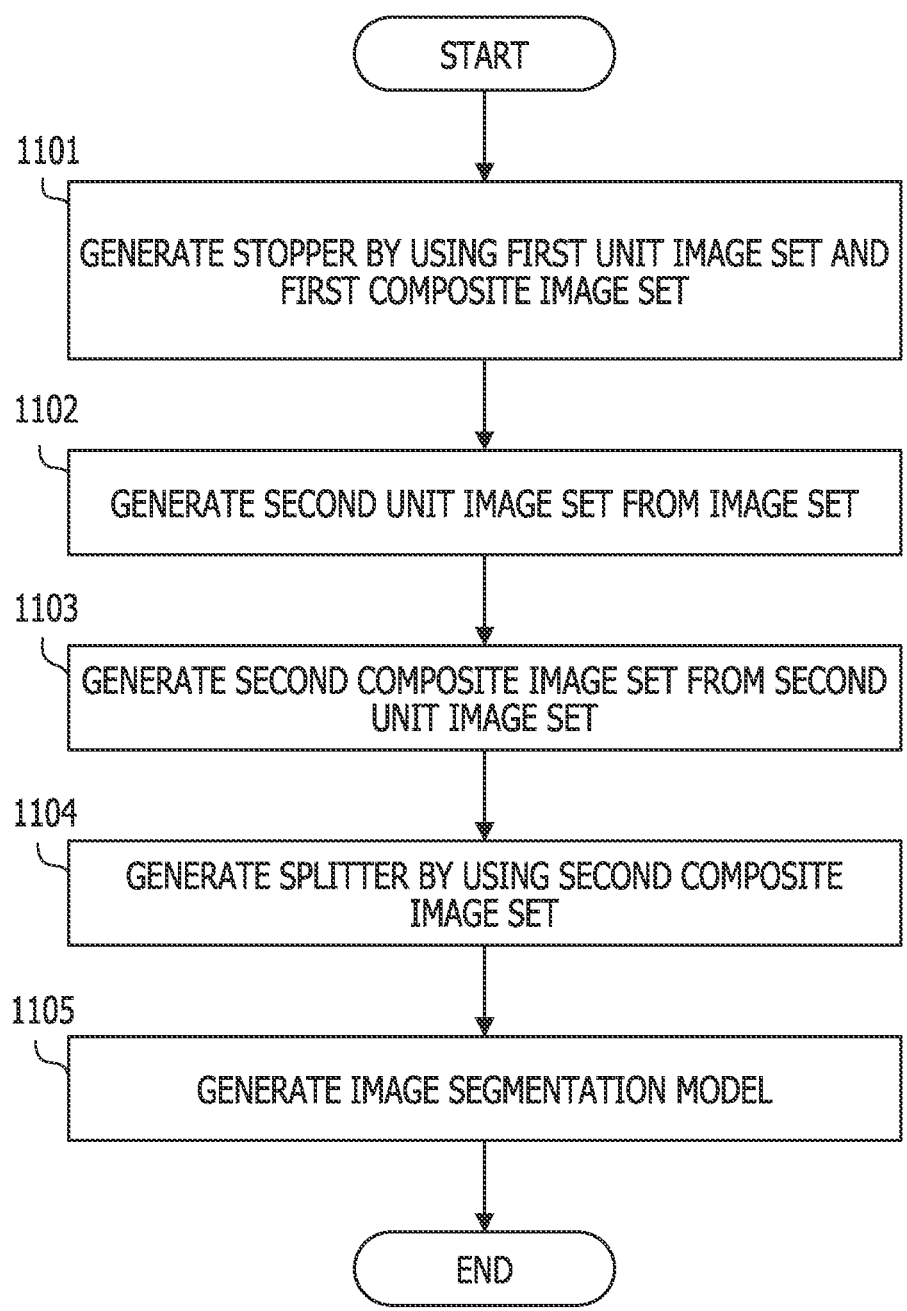
FIG. 11 is a flowchart of the training process.

FIG. 11 is a flowchart illustrating an example of the training process performed by the image segmentation apparatus 301 in FIG. 3 in the machine learning mode. First, the first generation unit 311 generates the stopper 331 through supervised machine learning using the first unit image set 321 and the first composite image set 322 (step 1101).

Subsequently, the second generation unit 312 inputs each image included in the image set 323 to the stopper 331 and selects images for which the determination result output from the stopper 331 indicates a unit image, thereby generating the second unit image set 325 (step 1102).

Subsequently, the second generation unit 312 generates a plurality of composite images by combining a plurality of images included in the second unit image set 325 based on the combination pattern 324. The second generation unit 312 assigns identification information indicating the combination pattern 324 of each composite image as teacher data for the composite image, and generates the second composite image set 326 (step 1103).

Subsequently, the second generation unit 312 generates the splitter 332 through supervised machine learning using the second composite image set 326 (step 1104). The third generation unit 313 generates the image segmentation model 327 by combining the stopper 331 and the splitter 332 (step 1105).

Figure 12:
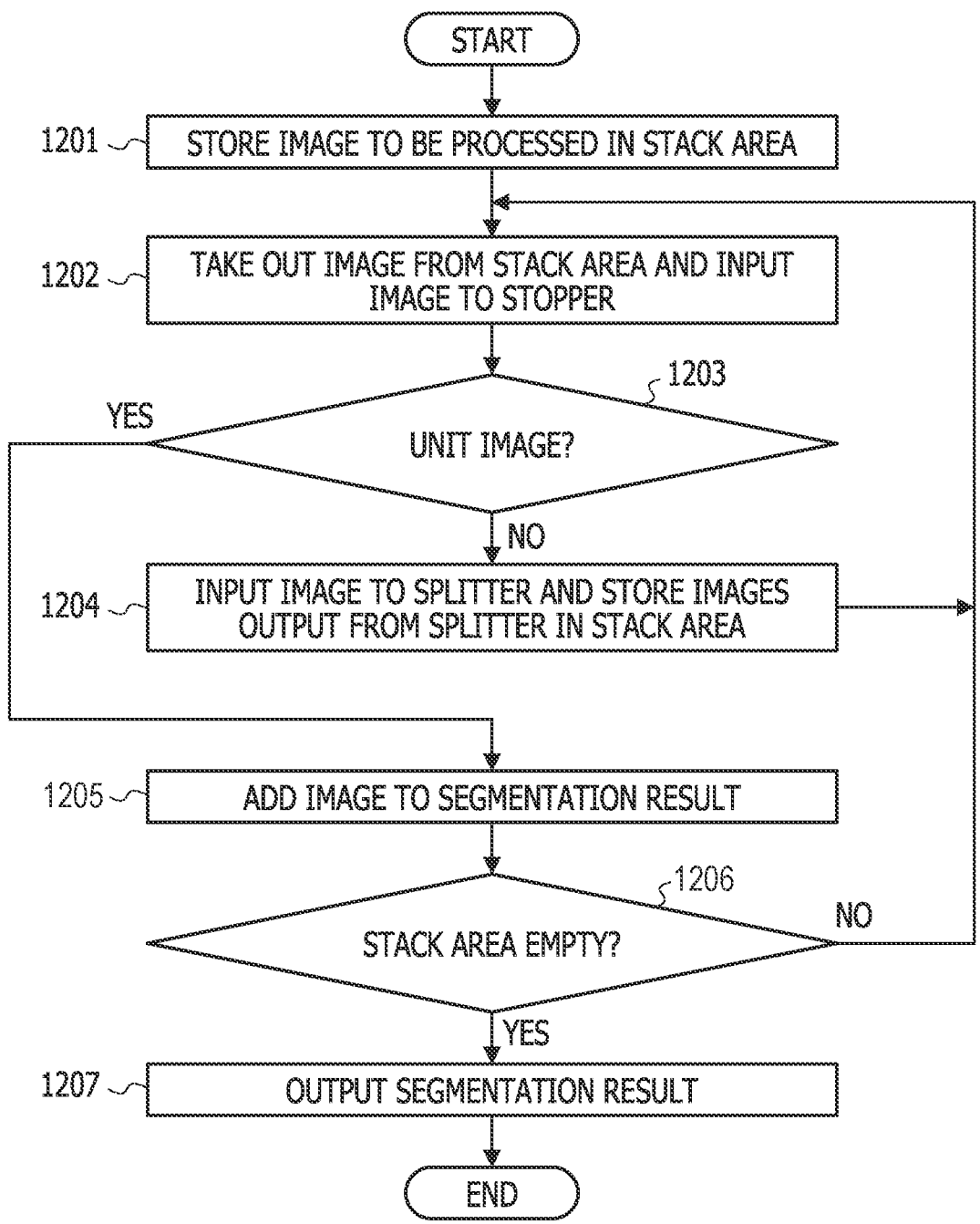
FIG. 12 is a flowchart illustrating a specific example of the image segmentation process.

FIG. 12 is a flowchart illustrating a specific example of the image segmentation process performed by the image segmentation apparatus 301 in FIG. 3 in the operation mode. First, the control unit 314 allocates a stack area in the storage unit 316 and stores the image 328 to be processed in the stack area (step 1201). The stack area is a last-in, first-out (LIFO) storage area.

Subsequently, the control unit 314 takes out the image 328 from the stack area and inputs the image 328 to the stopper 331, and the stopper 331 outputs a determination result for the image 328 (step 1202). The control unit 314 checks which of a unit image or a composite image the determination result indicates (step 1203).

In a case where the determination result indicates a unit image (YES in step 1203), the control unit 314 adds the image 328 to the segmentation result 329 (step 1205) and checks whether the stack area is empty (step 1206). In this case, the stack area is empty (YES in step 1206). Thus, the output unit 315 outputs the segmentation result 329 including only the image 328 as the unit image (step 1207).

On the other hand, in a case where the determination result indicates a composite image (NO in step 1203), the control unit 314 inputs the image 328 to the splitter 332. The splitter 332 segments the image 328 into a plurality of images in accordance with the combination pattern 324 and outputs the plurality of images. The control unit 314 stores the plurality of images output from the splitter 332 in the stack area (step 1204). The control unit 314 repeats the processing in step 1202 and subsequent steps for each of the images in the stack area.

In a case where the determination result for the image taken out from the stack area indicates a unit image (YES in step 1203), the control unit 314 adds the image to the segmentation result 329 (step 1205) and checks whether the stack area is empty (step 1206). In a case where the stack area is not empty (NO in step 1206), the control unit 314 repeats the processing in step 1202 and subsequent steps for the next image in the stack area.

In a case where the determination result for the image taken out from the stack area indicates a composite image (NO in step 1203), the control unit 314 inputs the image to the splitter 332. The splitter 332 segments the input image into a plurality of images in accordance with the combination pattern 324 and outputs the plurality of images. The control unit 314 stores the plurality of images output from the splitter 332 in the stack area (step 1204). The control unit 314 repeats the processing in step 1202 and subsequent steps.

If the stack area becomes empty (YES in step 1206), the output unit 315 outputs the segmentation result 329 including the plurality of images as unit images (step 1207).

The configurations of the image segmentation apparatus 101 in FIG. 1 and the image segmentation apparatus 301 in FIG. 3 are merely examples, and some components may be omitted or changed in accordance with the use or conditions of the image segmentation apparatuses. For example, in the image segmentation apparatus 301 in FIG. 3, the first generation unit 311, the second generation unit 312, and the third generation unit 313 may be omitted in a case where the training process is performed by an external apparatus.

Each of the flowcharts of FIGS. 2, 11, and 12 is merely an example, and part of the processes may be omitted or changed in accordance with the configurations or conditions of the image segmentation apparatuses. For example, in a case where the training process is performed by an external apparatus, the training process in FIG. 11 may be omitted. In a case where a plurality of composite images are generated by using the first unit image set 321 instead of the second unit image set 325 in step 1103 in FIG. 11, the processing in step 1102 may be omitted.

The combination pattern 324 illustrated in FIGS. 4A to 7 is merely an example, and the second generation unit 312 may generate a plurality of composite images by using another combination pattern 324. A shape of the area of the unit image may be a polygon or the like other than the rectangle. The training process illustrated in FIG. 8 is merely an example, and part of the process may be omitted or changed in accordance with the configurations or conditions of the image segmentation apparatuses. The image segmentation processes illustrated in FIGS. 9 and 10 are merely an example, and a manner of segmentation of an image changes in accordance with the image 328 to be processed.

Figure 13:
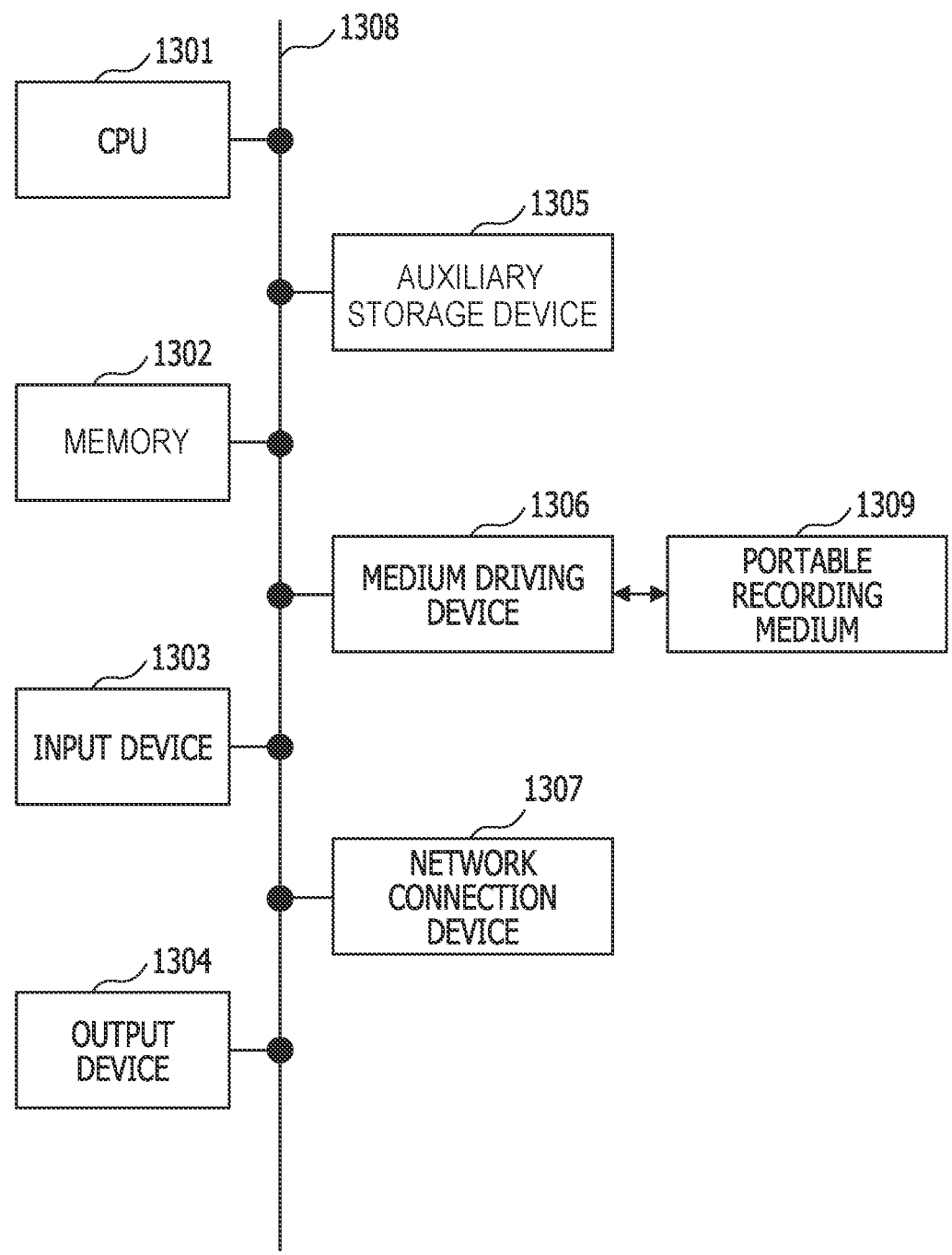
FIG. 13 is a hardware configuration diagram of an information processing apparatus.

FIG. 13 illustrates an example of a hardware configuration of an information processing apparatus (computer) used as the image segmentation apparatus 101 in FIG. 1 and the image segmentation apparatus 301 in FIG. 3. The information processing apparatus in FIG. 13 includes a central processing unit (CPU) 1301, a memory 1302, an input device 1303, an output device 1304, an auxiliary storage device 1305, a medium driving device 1306, and a network connection device 1307. These components are pieces of hardware and are coupled to one another via a bus 1308.

The memory 1302 is, for example, a semiconductor memory such as a read-only memory (ROM) or a random-access memory (RAM), and stores a program and data used for processing. The memory 1302 may operate as the storage unit 316 illustrated in FIG. 3.

The CPU 1301 operates as the control unit 111 in FIG. 1 by executing a program using the memory 1302, for example. The CPU 1301 also operates as the first generation unit 311, the second generation unit 312, the third generation unit 313, and the control unit 314 in FIG. 3 by executing a program using the memory 1302.

The input device 1303 is, for example, a keyboard, a pointing device, or the like, and is used by a user or operator to input an instruction or information. The output device 1304 is, for example, a display device, a printer, or the like, and is used to output an inquiry or instruction to an operator or user and to output a processing result. The processing result may be the segmentation result 329. The output device 1304 may also operate as the output unit 315 in FIG. 3.

The auxiliary storage device 1305 is, for example, a magnetic disk device, an optical disc device, a magneto-optical disk device, a tape device, or the like. The auxiliary storage device 1305 may be a hard disk drive. The information processing apparatus may store a program and data in the auxiliary storage device 1305 and load those program and data into the memory 1302 for use. The auxiliary storage device 1305 may operate as the storage unit 316 in FIG. 3.

The medium driving device 1306 drives a portable recording medium 1309 and accesses recorded contents thereof. The portable recording medium 1309 is a memory device, a flexible disk, an optical disc, a magneto-optical disk, or the like. The portable recording medium 1309 may be a compact disc read-only memory (CD-ROM), a Digital Versatile Disc (DVD), a Universal Serial Bus (USB) memory, or the like. A user or operator may store a program and data in the portable recording medium 1309, and load those program and data into the memory 1302 for use.

As described above, the computer readable recording medium storing the program and data used for processing is a physical (non-transitory) recording medium, such as the memory 1302, the auxiliary storage device 1305, or the portable recording medium 1309.

The network connection device 1307 is a communication interface circuit that is coupled to a communication network such as a local area network (LAN) or a wide area network (WAN), and performs data conversion involved in communication. The information processing apparatus may receive the program and data from an external apparatus via the network connection device 1307 and load those program and data into the memory 1302 for use. The network connection device 1307 may operate as the output unit 315 in FIG. 3.

The information processing apparatus does not necessarily include all the components illustrated in FIG. 13, and some of the components may be omitted in accordance with the use or conditions of the information processing apparatus. For example, in a case where an interface to a user or operator is not to be used, the input device 1303 and the output device 1304 may be omitted. In a case where the portable recording medium 1309 or the communication network is not to be used, the medium driving device 1306 or the network connection device 1307 may be omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a program for causing a computer to execute a process, the process comprising:
    inputting an accepted image to a first model generated through machine learning based on first training data and the first training data including a composite image, the composite image being obtained by combining a first plurality of images each of which includes one area;
    assigning identification information, the identification information indicating a predetermined combination pattern of each of the first plurality of images;
    inputting a first image among a second plurality of images to a second model generated through machine learning based on second training data, the second plurality of images being output by the first model in response to the inputting of the accepted image and obtained by segmenting the accepted image, the second training data including an image which includes one area and an image which includes a plurality of areas; and
    determining whether to input the first image to the first model, based on a result output by the second model in response to the inputting of the first image, the composite image is generated by combining the first plurality of images based on the predetermined combination pattern and the predetermined combination pattern represents rules that define combination states of the first plurality of images and the second plurality of images while maintaining aspect ratios of each of the first plurality of images.

2. The non-transitory computer-readable recording medium according to claim 1, the process further comprising:

outputting the first image as an image which includes one area, in a case where it is determined that the first image is not to be input to the first model.

3. The non-transitory computer-readable recording medium according to claim 1, the process further comprising:
inputting the first image to the first model in a case where it is determined that the first image is to be input to the first model; and
inputting, to the second model, a second image among a third plurality of images that are output by the first model in response to the inputting of the first image and that are obtained by segmenting the first image.

4. The non-transitory computer-readable recording medium according to claim 1, wherein the first plurality of images are selected from among a fourth plurality of images included in an image set, based on a result output by the second model in response to inputting of each of the fourth plurality of images.

5. A model generation method, comprising:
inputting, by a computer, an accepted image to a first model generated through machine learning based on first training data and the first training data including a composite image, the composite image being obtained by combining a first plurality of images each of which includes one area;
assigning identification information, the identification information indicating a predetermined combination pattern of each of the first plurality of images;
inputting a first image among a second plurality of images to a second model generated through machine learning based on second training data, the second plurality of images being output by the first model in response to the inputting of the accepted image and obtained by segmenting the accepted image, the second training data including an image which includes one area and an image which includes a plurality of areas; and
determining whether to input the first image to the first model, based on a result output by the second model in response to the inputting of the first image, the composite image is generated by combining the first plurality of images based on the predetermined combination pattern and the predetermined combination pattern represents rules that define combination states of the first plurality of images and the second plurality of images while maintaining aspect ratios of each of the first plurality of images.

6. The model generation method according to claim 5, further comprising:
outputting the first image as an image which includes one area, in a case where it is determined that the first image is not to be input to the first model.

7. The model generation method according to claim 5, further comprising:
inputting the first image to the first model in a case where it is determined that the first image is to be input to the first model; and
inputting, to the second model, a second image among a third plurality of images that are output by the first model in response to the inputting of the first image and that are obtained by segmenting the first image.

8. The model generation method according to claim 5, wherein the first plurality of images are selected from among a fourth plurality of images included in an image set, based on a result output by the second model in response to inputting of each of the fourth plurality of images.

9. An information processing apparatus, comprising:
a memory; and
a processor coupled to the memory and the processor configured to:
input an accepted image to a first model generated through machine learning based on first training data and the first training data including a composite image, the composite image being obtained by combining a first plurality of images each of which includes one area;
assigning identification information, the identification information indicating a predetermined combination pattern of each of the first plurality of images;
input a first image among a second plurality of images to a second model generated through machine learning based on second training data, the second plurality of images being output by the first model in response to the inputting of the accepted image and obtained by segmenting the accepted image, the second training data including an image which includes one area and an image which includes a plurality of areas; and
determine whether to input the first image to the first model, based on a result output by the second model in response to the inputting of the first image, the composite image is generated by combining the first plurality of images based on the predetermined combination pattern and the predetermined combination pattern represents rules that define combination states of the first plurality of images and the second plurality of images while maintaining aspect ratios of each of the first plurality of images.

10. The information processing apparatus according to claim 9, wherein the processor is further configured to:
output the first image as an image which includes one area, in a case where it is determined that the first image is not to be input to the first model.

11. The information processing apparatus according to claim 9, wherein the processor is further configured to:
input the first image to the first model in a case where it is determined that the first image is to be input to the first model; and
input, to the second model, a second image among a third plurality of images that are output by the first model in response to the inputting of the first image and that are obtained by segmenting the first image.

12. The information processing apparatus according to claim 9, wherein the first plurality of images are selected from among a fourth plurality of images included in an image set, based on a result output by the second model in response to inputting of each of the fourth plurality of images.

* * * * *